United States Patent [19]

DuNah et al.

[11] Patent Number: 5,420,761
[45] Date of Patent: May 30, 1995

[54] FLAT, THIN, UNIFORM THICKNESS LARGE AREA LIGHT SOURCE

[75] Inventors: Richard E. DuNah; William F. Redmond, both of Sonoma County; Werner W. Ciupke, San Mateo County, all of Calif.

[73] Assignee: Precision Lamp, Inc., Cotati, Calif.

[21] Appl. No.: 242,700

[22] Filed: May 13, 1994

Related U.S. Application Data

[63] Continuation of Ser. No. 38,473, Mar. 29, 1993, abandoned.

[51] Int. Cl.6 ............................................. F21V 8/00
[52] U.S. Cl. ........................................ 362/31; 362/330
[58] Field of Search ................... 362/31, 326, 327, 330

[56]  References Cited

U.S. PATENT DOCUMENTS

| | | |
|---|---|---|
| 4,257,084 | 3/1981 | Reynolds . |
| 4,277,817 | 7/1981 | Hehr . |
| 4,323,951 | 4/1982 | Pasco . |
| 4,528,617 | 7/1985 | Blackington . |
| 4,706,173 | 11/1987 | Hamada et al. . |
| 4,799,137 | 1/1989 | Aho . |
| 4,883,333 | 11/1989 | Yanez . |
| 4,984,144 | 1/1991 | Cobb, Jr. et al. ................ 362/31 |
| 5,046,826 | 9/1991 | Iwamoto et al. ................ 362/31 |
| 5,050,946 | 9/1991 | Hathaway et al. . |
| 5,079,675 | 1/1992 | Nakayama ...................... 362/31 |
| 5,128,842 | 7/1992 | Kenmochi ...................... 362/31 |
| 5,134,549 | 7/1992 | Yokoyama ..................... 362/31 |
| 5,262,928 | 11/1993 | Kashme et al. ................. 362/31 |

FOREIGN PATENT DOCUMENTS

| | | |
|---|---|---|
| 0500960 | 9/1992 | European Pat. Off. . |
| 2632432 | 12/1989 | France . |
| 3825436 | 3/1989 | Germany ................. 350/96.10 |
| 0073206 | 4/1987 | Japan ..................... 350/96.10 |
| 0271301 | 11/1988 | Japan ..................... 350/96.10 |
| 0287803 | 11/1988 | Japan ..................... 350/96.10 |
| 2165631 | 4/1986 | United Kingdom . |
| WO88/05589 | 7/1988 | WIPO . |

Primary Examiner—Ira S. Lazarus
Assistant Examiner—Sara Sachie Raab
Attorney, Agent, or Firm—Flehr, Hohbach, Test, Albritton & Herbert

[57]  ABSTRACT

A flat, thin, large area light source employing a flat, thin light guide having a flat major surface and a shaped parallel major surface, and means for injecting light into one end of the side light guide whereby light is emitted uniformly from one of the major surfaces.

13 Claims, 2 Drawing Sheets

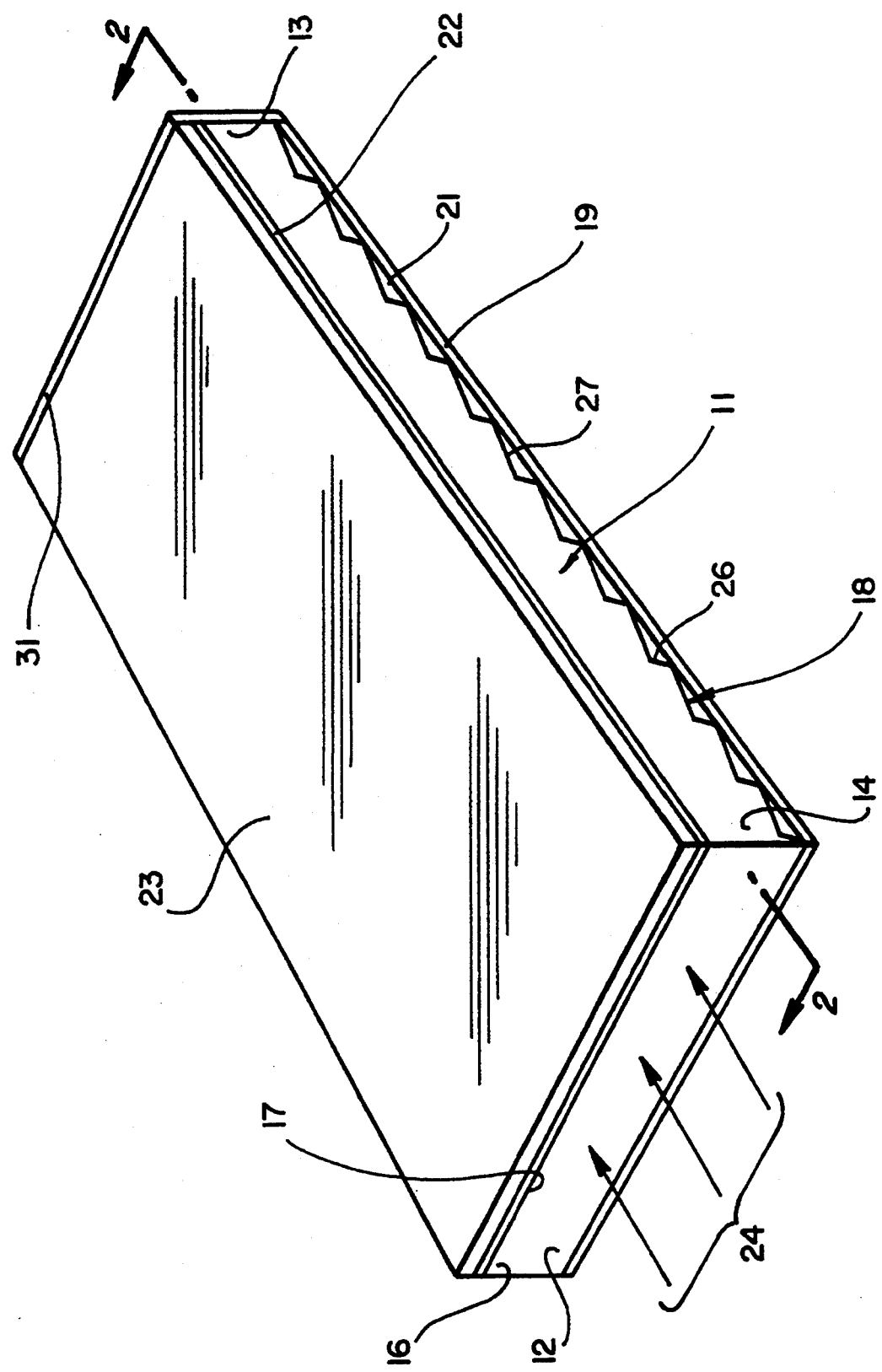
FIG_1

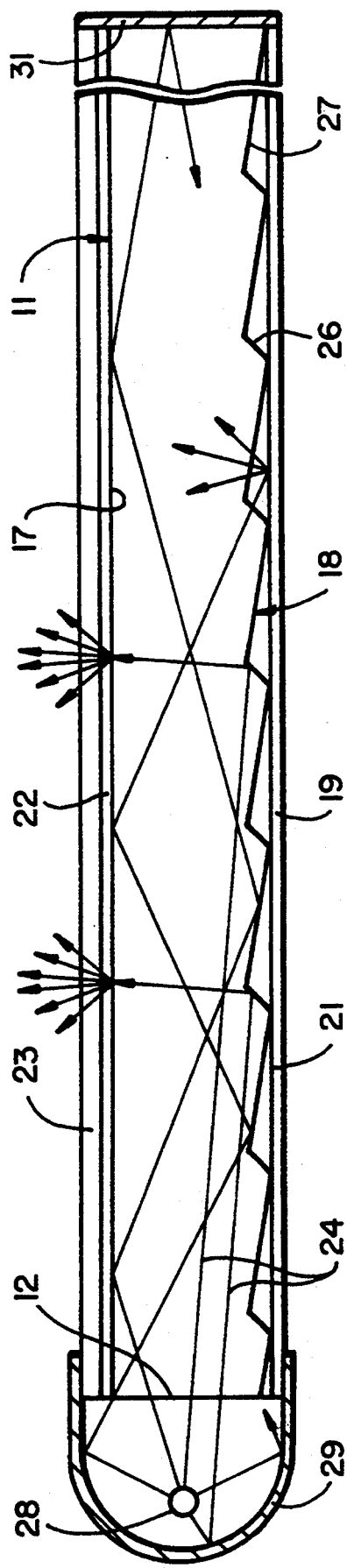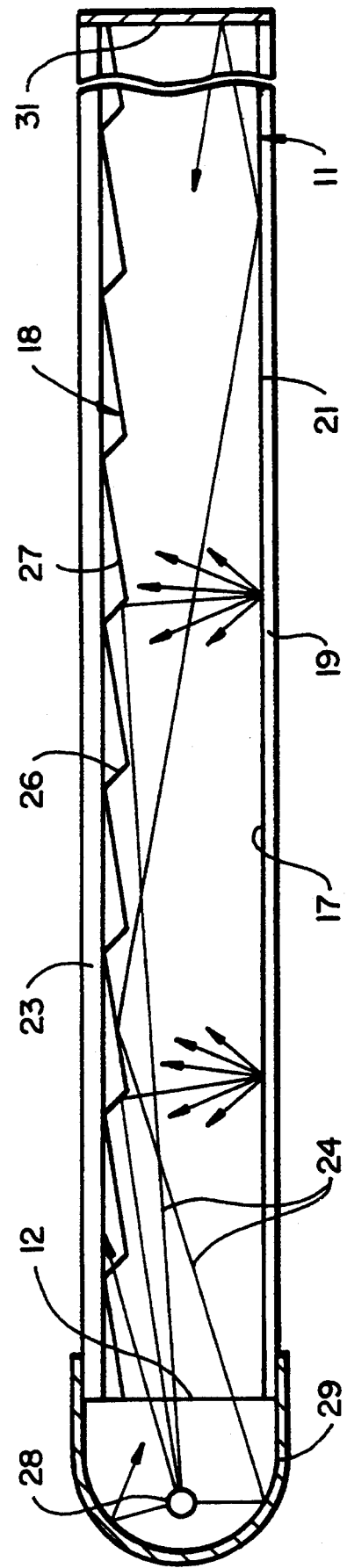

FLAT, THIN, UNIFORM THICKNESS LARGE AREA LIGHT SOURCE

This is a continuation of application Ser. No. 08/038,473, filed Mar. 29, 1993, now abandoned.

BRIEF DESCRIPTION OF THE INVENTION

This invention relates generally to a fiat, thin, large area light source, and more particularly to a large area light source employing a thin, flat light guide having a shaped major surface and a parallel planar major surface.

BACKGROUND OF THE INVENTION

Large area light sources employing light guides with edge lit end surfaces are known. These large area light sources all have in common the fact that they do not have a uniform thickness, which is desirable in many applications, such as back-lighting of liquid crystal displays (LCDs) for pagers, hand-held computers, organizers and the like. Examples of prior art light sources are described in the following patents:

U.S. Pat. No. 4,706,173 discloses a light reflecting apparatus which uses a lamp, probably a fluorescent lamp, with light impinging on a series of reflective surfaces which reflect the light into an opposite smooth surface.

U.S. Pat. No. 4,277,817 discloses two embodiments of a wedge-shaped body for directing light, preferably for back-lighting in LCDs.

U.S. Pat. No. 4,257,084 discloses a display which reflects light off an angled surface. The light is then transmitted through a diffused surface.

U.S. Pat. No. 4,323,951 discloses a display having generally laminar light transmissive layers, one of which has a roughened back surface whereby light will be transmitted through a front surface of the laminar unit.

U.S. Pat. No. 5,050,946 discloses a light pipe which has a planar front surface for back-lighting LCDs. Light is injected into the light pipe from the ends. The back surface has a series of planar portions parallel to the front surface connected by facets, which are angled so that the injected light reflects off the facets through the front surface. A reflector having a planar, highly reflective, highly scattering surface or a sawtoothed or grooved upper surface is located adjacent to and parallel with the light pipe back surface to reflect light escaping from the back surface back through the light pipe to exit the front surface.

OBJECTS AND SUMMARY OF THE INVENTION

It is an object of this invention to provide a thin, uniform thickness, large area light source.

It is another object of the invention to provide a thin, uniform thickness, uniformly lit large area light source.

It is another object of the invention to provide a thin, large area light source employing a thin, flat light guide having a planar major surface and a parallel shaped major surface.

It is a further object of the invention to provide a large area light source employing a thin, flat light guide having a planar major surface and a parallel, faceted major surface.

The foregoing and other object of the invention are achieved by a thin, rectangular light guide having planar side and end surfaces and parallel major surfaces with one of said parallel major surfaces shaped to have parallel reflecting surfaces extending between the side surfaces and sloping surfaces joining the reflecting surfaces, also extending between the side surfaces, and reflector means adjacent to one of said major surfaces for reflecting transmitted light through said other major surface, whereby light projected into said end surfaces is reflected by the reflecting surfaces toward the planar major surface for transmission through said surface, and another portion is transmitted through one surface and reflected toward the other surface.

BRIEF DESCRIPTION OF THE DRAWINGS

The foregoing and other objects of the invention will be clearly understood from the following description when read in conjunction with the drawings of which:

FIG. 1 is a prospective view of a light guide assembly in accordance with one embodiment of the invention;

FIG. 2 is an enlarged cross-sectional view, taken along the lines 2—2 of the assembly of FIG. 1, showing a light source associated with one end surface; and FIG. 3 shows another embodiment of the invention.

DESCRIPTION OF THE PREFERRED EMBODIMENT

Referring to FIG. 1, the light guide 11 includes parallel first and second end surfaces 12 and 13, joined by side surfaces 14 and 16, a planar upper surface 17, and a shaped lower surface 18. In the embodiment illustrated in FIG. 1, there is provided a lower surface 19 which includes a highly reflective light scattering face 21, and an upper diffuser layer 22, which diffuses the light projected upwardly through the panel. The light may, for example, illuminate a liquid crystal display 23. Generally, light indicated by the arrows 24 is projected into the light guide through the transparent end surface and is reflected upwardly by the facets or reflector 26 in the shaped lower surface. The light reflected by the facets projects upwardly through the upper planar surfaces and is diffused by the diffusion layer. Light which escapes downwardly through the lower shaped surface is reflected upwardly by the reflective face 21 through the light guide to the upper surface, thereby providing a uniform illumination of the LCD. The facets 26 and sloped surfaces 27 which join the facets extend between the side surfaces 14, 16.

Referring to FIG. 2, the light panel is shown associated with a light source 28 and a reflector 29 which reflects the light into the end 12. The light pipe is an internally reflecting member in which light is extracted by the major shaped surface 18 including the facets 26 and connecting sloped surfaces 27. More particularly, light striking the facets is reflected upwardly through the diffusing surface 22 where it is scattered to improve the uniformity of light exiting through the planar upper surface 17 and exiting the diffusion surface to illuminate the LCD 23. Light which strikes the reflecting or faceted surfaces at greater than critical angle is transmitted through the light pipe reflected off the reflecting surface 21 back through the light pipe and upwardly through the upper planar surface where it is diffused and illuminates the LCD. The end reflector 31 reflects any light transmitted through the panel back into the panel where it is reflected within the light guide and either is extracted at the upper surface or the lower surface and is reflected back, thereby further adding to the efficiency of the light distribution and transmission of the flat panel. Any light travelling back through the panel is reflected back into the panel by reflector 29.

A suitable light source 18 may be an incandescent lamp, light emitting diode, fluorescent lamp, etc. Efficiency of the light ejecting light source is improved by the reflector. It may be desirable in certain instances to substitute the reflector 31 with another light source which projects light in the opposite end of the light guide. Efficiency of the light pipe can be increased by providing an anti-reflective coating on the surface 12 using a lens or other suitable means for focusing the light from the source onto the end surface.

Typical facet depth is 2–10 microns and the spacing between facets is between 100–250 microns, and the angle between the facets and normal to the light pipe is typically between 45° and 55°. The thickness of the light pipe is typically 1 mm or less to match the dimensions of miniature light sources. The light guide 11 is typically an injection molded light transmissive plastic member which, depending on the light source, can emit white light or can be tinted to any desired color for respective colored light emission. By having a light guide of thin, uniform thickness, warping of the light guide after injection molding is minimized. The manufacturing process is therefore simplified, and there are no secondary operations such as edge finishing or pattern application as needed in existing technologies.

FIG. 3 shows another embodiment of the invention with the highly reflecting and scattering surface 21 located adjacent to the planar surface. Light injected into the light pipe is reflected from the facets 26 through the light pipe, exits the planar surface and is then reflected by the reflecting surface 21 back through the light pipe and exits the sloping surfaces 27, where it illuminates the LCD 23. The use of diffuser 22 may be optional in the embodiment of FIG. 3, thus saving the use of one additional component and its associated loss.

What is claimed is:

1. A thin, large area light source comprising:
    a flat, thin rectangular light guide formed of a transparent member having a planar end, a planar first major surface, a faceted second major surface parallel to said first major surface and side surfaces joining said first and second major surfaces, said second major surface having a plurality of parallel light reflecting facets extending between said side surfaces and a plurality of light transmitting facets extending between said side surfaces and joining said light reflecting facets, said light reflecting facets having an orientation relative to said first major surface and said planar end for reflecting light striking said light reflecting facets through said first major surface and said light transmitting facets having an orientation relative to said first major surface and said planar end for transmitting light striking said light transmitting facets along said light guide, said light reflecting facets and the plane of said second major surface being separated by a first angle and said light transmitting facets and the plane of said second major surface being separated by a second angle less than said first angle;
    a reflective light scattering surface adjacent to one of said first or second major surfaces for reflecting light which projects through the adjacent one of said major surfaces back into the light guide, and
    a light source for injecting light into said light guide through said planar end whereby a portion of the light is reflected by said light reflecting facets and by said reflective light scattering surface through the other of said first or second major surfaces and a portion of the light is transmitted along said light guide by said light transmitting facets.

2. A thin, large area light source as in claim 1 wherein the reflective light scattering surface is adjacent to the second major surface to reflect light projecting from the second major surface to the first major surface.

3. A thin, large area light source as in claim 1 wherein the reflective light scattering surface is adjacent to the first major surface to reflect light through the light guide to the second major surface.

4. A thin, large area light source as in claim 2 including a diffusing means on said first major surface.

5. A thin, large area light source as in claims 1, 2, 4 or 3 wherein said light guide has a second planar end opposite the first-mentioned planar end, and including a reflective means adjacent to the second planar end to reflect light back into said light guide.

6. A thin, large area light source as in claim 1 wherein said light guide has a thickness of approximately 1 mm or less and the angle between said light reflecting facets and a normal axis to the plane of said second major surface of said light guide measures approximately 45° to 55°.

7. A thin, large area light source as in claim 1 wherein said light reflecting facets are separated by a spacing of approximately 100 to 250 microns and have a depth of approximately 2 to 10 microns.

8. A thin, large area light source comprising:
    a flat, thin rectangular light guide formed from a transparent member having a planar end, a planar first major surface, a faceted second major surface parallel to said first major surface and side surfaces joining said first and second major surfaces, said second major surface having a plurality of parallel light reflecting facets extending between said side surfaces and a plurality of light transmitting facets extending between said side surfaces and joining said light reflecting facets, said light reflecting facets having an orientation relative to said first major surface for reflecting light striking said light reflecting facets through said first major surface and said light transmitting facets having an orientation relative to said first major surface for transmitting light striking said light transmitting facet along said light guide;
    a reflective light scattering surface adjacent said first major surface for reflecting light which projects through said first major surface back into the light guide and to said second major surface, and
    a light source for injecting light into said light guide through said planar end whereby the light is reflected by said light reflecting facets and by said reflective light scattering surface through the second major surface.

9. A thin, large area light source as in claim 8 including a diffusing means on said second major surface.

10. A thin, large area light source as in claims 8 or 9 wherein said light guide has a second planar end opposite the first-mentioned planar end, and including a reflective means adjacent to the second planar end to reflect light back into said light guide.

11. A thin, large area light source as in claim 8 wherein said light guide has a thickness of approximately 1 mm or less and the angle between said light reflecting facets and a normal axis to the plane of said second major surface of said light guide measures approximately 45° to 55°.

12. A thin, large area light source as in claim 8 wherein said light reflecting facets are separated by a spacing of approximately 100 to 250 microns and have a depth of approximately 2 to 10 microns.

13. A thin, large area light source comprising:
a flat, thin rectangular light guide formed from a transparent member having a planar end, a planar first major surface, a faceted second major surface parallel to said first major surface and side surfaces joining said first and second major surfaces, said second major surface having a plurality of parallel light reflecting facets extending between said side surfaces and a plurality of light transmitting facets extending between said side surfaces and joining said light reflecting facets;
a reflective light scattering surface adjacent said first major surface for reflecting light which projects through said first major surface back into the light guide and to said second major surface, and
a light source for injecting light into said light guide through said planar end whereby the light is reflected by said light reflecting facets and by said reflective light scattering surface through the second major surface;
wherein the angle between said light transmitting facets and the plane of said second major surface is less than the angle between said light reflecting facets and the plane of said second major surface.

* * * * *